(12) United States Patent
Thomson et al.

(10) Patent No.: US 7,847,728 B2
(45) Date of Patent: Dec. 7, 2010

(54) SYSTEM AND METHOD FOR A-GPS POSITIONING OF A MOBILE DEVICE

(75) Inventors: Martin Thomson, Keiravilla (AU); Neil Harper, Mangerton (AU); Khiem Tran, Sutherland (AU)

(73) Assignee: Andrew, LLC, Hickory, NC (US)

( * ) Notice: Subject to any disclaimer, the term of this patent is extended or adjusted under 35 U.S.C. 154(b) by 269 days.

(21) Appl. No.: 12/099,694

(22) Filed: Apr. 8, 2008

(65) Prior Publication Data
US 2009/0146876 A1 Jun. 11, 2009

Related U.S. Application Data

(60) Provisional application No. 61/012,319, filed on Dec. 7, 2007.

(51) Int. Cl.
*G01S 19/05* (2010.01)
(52) U.S. Cl. .................................. 342/357.42
(58) Field of Classification Search ............ 342/357.09, 342/357.12, 357.42
See application file for complete search history.

(56) References Cited

U.S. PATENT DOCUMENTS

| | | | |
|---|---|---|---|
| 5,543,813 A | 8/1996 | Araki et al. |
| 5,999,125 A | 12/1999 | Kurby |
| 6,278,404 B1 | 8/2001 | Niles |
| 6,429,808 B1 | 8/2002 | King et al. |
| 6,583,756 B2 | 6/2003 | Sheynblat |
| 6,661,371 B2 | 12/2003 | King et al. |
| 6,804,290 B1 | 10/2004 | King et al. |
| 6,825,805 B2 | 11/2004 | Rowitch |
| 7,019,690 B1 | 3/2006 | Pitt |
| 7,064,706 B2 | 6/2006 | King et al. |

(Continued)

FOREIGN PATENT DOCUMENTS

EP 0984295 A 3/2000

(Continued)

OTHER PUBLICATIONS

European Patent Office, International Search Report in related PCT Application No. PCT/US2008/013236, mailed May 6, 2009, p. 1-4.

(Continued)

*Primary Examiner*—Thomas H Tarcza
*Assistant Examiner*—Harry Liu
(74) *Attorney, Agent, or Firm*—Duane Morris, LLP

(57) ABSTRACT

A system and method for estimating the position of a mobile device using information from a constellation of satellites. A first set of satellites of the constellation may be selected and then a second set of satellites of the constellation may be selected as a function of signals received from the first set of satellites. Data may be transmitted to the mobile device based on signals received from the second set of satellites, and a location of the device estimated based on the data. One embodiment may select the second set as a function of an intersection of coverage areas of ones of the first set of satellites. Another embodiment may select the second set as a function of one or more satellites that are not occluded by the Earth from one or more of the first set of satellites.

15 Claims, 10 Drawing Sheets

U.S. PATENT DOCUMENTS

| | | |
|---|---|---|
| 7,138,943 B2 | 11/2006 | Sheynblat |
| 7,142,155 B2 | 11/2006 | Iwami |
| 7,453,925 B2 * | 11/2008 | Keegan et al. ............... 375/148 |
| 2003/0011511 A1 | 1/2003 | King et al. |
| 2005/0164713 A1 | 7/2005 | Tang-Taye |
| 2005/0212700 A1 | 9/2005 | Diggelen et al. |
| 2006/0012515 A1 | 1/2006 | Park et al. |
| 2006/0046747 A1 * | 3/2006 | Abraham et al. ......... 455/456.6 |
| 2006/0111840 A1 | 5/2006 | van Diggelen |
| 2007/0236387 A1 | 10/2007 | Monnerat |

FOREIGN PATENT DOCUMENTS

| | | | |
|---|---|---|---|
| EP | 1783509 A1 | 5/2007 | |

OTHER PUBLICATIONS

European Patent Office, International Search Report in related PCT Application No. PCT/US2008/013239, mailed May 6, 2009, p. 1-4.

European Patent Office, International Search Report in related PCT Application No. PCT/US2008/013231, mailed May 6, 2009, p. 1-4.

European Patent Office, International Search Report in related PCT Application No. PCT/US2008/013237, mailed May 6, 2009, p. 1-3.

Glennon, E. and Bryant, R., "Soluton of Timing Errors for AGPS," 18th Int. Tech. Meeting of the Satellite Division of the U.S. Institute of Navigation, Long Beach, CA, Sep. 13-16, 2005.

Hill, Jonathan, "The Principle of a Snapshot Navigation Solution Based on Doppler Shift," ION GPS 2001, Salt Lake City, UT, Sep. 11-14, 2001, p. 3044-3051.

* cited by examiner

400

410
Determine first plurality of satellites

420
Determine second plurality of satellites as a function of an intersection of coverage areas 430
Transmit assistance data 440
Estimate location of device

510
Determine first set of satellites

520
Determine second set of satellites as a function of one or more satellites that are not occluded by the Earth

530
Transmit assistance data

540
Estimate location of device

610
Receive first information from a first set of satellites

620
Receive second information from a second set of satellites

630
Transmit data to the device

640
Estimate location of the device

710
Select first
set of satellites

720
Select second
set of satellites

730
Transmit data
to a device

740
Estimate location
of the device

*Fig. 7*

SYSTEM AND METHOD FOR A-GPS POSITIONING OF A MOBILE DEVICE

RELATED APPLICATIONS

The instant application claims the priority benefit of U.S. Provisional Application No. 61/012,319, filed Dec. 7, 2007, the entirety of which is incorporated herein by reference.

BACKGROUND

Radio communication systems generally provide two-way voice and data communication between remote locations. Examples of such systems are cellular and personal communication system ("PCS") radio systems, trunked radio systems, dispatch radio networks, and global mobile personal communication systems ("GMPCS") such as satellite-based systems. Communication in these systems is conducted according to a pre-defined standard. Mobile devices or stations, also known as handsets, portables or radiotelephones, conform to the system standard to communicate with one or more fixed base stations. It is important to determine the location of such a device capable of radio communication especially in an emergency situation. In addition, the United States Federal Communications Commission ("FCC") has required that cellular handsets must be geographically locatable by the year 2001. This capability is desirable for emergency systems such as Enhanced 911 ("E-911"). The FCC requires stringent accuracy and availability performance objectives and demands that cellular handsets be locatable within 100 meters 67% of the time for network based solutions and within 50 meters 67% of the time for handset based solutions.

Current generations of radio communication generally possess limited mobile device location determination capability. In one technique, the position of the mobile device is determined by monitoring mobile device transmissions at several base stations. From time of arrival or comparable measurements, the mobile device's position may be calculated. However, the precision of this technique may be limited and, at times, may be insufficient to meet FCC requirements. In another technique, a mobile device may be equipped with a receiver suitable for use with a Global Navigation Satellite System ("GNSS") such as the Global Positioning System ("GPS"). GPS is a radio positioning system providing subscribers with highly accurate position, velocity, and time ("PVT") information.

FIG. 1 is a schematic representation of a constellation 100 of GPS satellites 101. With reference to FIG. 1, GPS may include a constellation of GPS satellites 101 in non-geosynchronous orbits around the earth. The GPS satellites 101 travel in six orbital planes 102 with four of the GPS satellites 101 in each plane. Of course, a multitude of on-orbit spare satellites may also exist. Each orbital plane has an inclination of 55 degrees relative to the equator. In addition, each orbital plane has an elevation of approximately 20,200 km (10,900 miles). The time required to travel the entire orbit is just under 12 hours. Thus, at any given location on the surface of the earth with clear view of the sky, at least five GPS satellites are generally visible at any given time.

With GPS, signals from the satellites arrive at a GPS receiver and are utilized to determine the position of the receiver. GPS position determination is made based on the time of arrival ("TOA") of various satellite signals. Each of the orbiting GPS satellites 101 broadcasts spread spectrum microwave signals encoded with satellite ephemeris information and other information that allows a position to be calculated by the receiver. Presently, two types of GPS measurements corresponding to each correlator channel with a locked GPS satellite signal are available for GPS receivers. The two carrier signals, L1 and L2, possess frequencies of 1.5754 GHz and 1.2276 GHz, or wavelengths of 0.1903 m and 0.2442 m, respectively. The L1 frequency carries the navigation data as well as the standard positioning code, while the L2 frequency carries the P code and is used for precision positioning code for military applications. The signals are modulated using bi-phase shift keying techniques. The signals are broadcast at precisely known times and at precisely known intervals and each signal is encoded with its precise transmission time.

GPS receivers measure and analyze signals from the satellites, and estimate the corresponding coordinates of the receiver position, as well as the instantaneous receiver clock bias. GPS receivers may also measure the velocity of the receiver. The quality of these estimates depends upon the number and the geometry of satellites in view, measurement error and residual biases. Residual biases generally include satellite ephemeris bias, satellite and receiver clock errors and ionospheric and tropospheric delays. If receiver clocks were perfectly synchronized with the satellite clocks, only three range measurements would be needed to allow a user to compute a three-dimensional position. This process is known as multilateration. However, given the engineering difficulties and the expense of providing a receiver clock whose time is exactly synchronized, conventional systems account for the amount by which the receiver clock time differs from the satellite clock time when computing a receiver's position. This clock bias is determined by computing a measurement from a fourth satellite using a processor in the receiver that correlates the ranges measured from each satellite. This process requires four or more satellites from which four or more measurements can be obtained to estimate four unknowns x, y, z, b. The unknowns are latitude, longitude, elevation and receiver clock offset. The amount b, by which the processor has added or subtracted time is the instantaneous bias between the receiver clock and the satellite clock. It is possible to calculate a location with only three satellites when additional information is available. For example, if the elevation of the handset or mobile device is well known, then an arbitrary satellite measurement may be included that is centered at the center of the earth and possesses a range defined as the distance from the center of the earth to the known elevation of the handset or mobile device. The elevation of the handset may be known from another sensor or from information from the cell location in the case where the handset is in a cellular network.

Traditionally, satellite coordinates and velocity have been computed inside the GPS receiver. The receiver obtains satellite ephemeris and clock correction data by demodulating the satellite broadcast message stream. The satellite transmission contains more than 400 bits of data transmitted at 50 bits per second. The constants contained in the ephemeris data coincide with Kepler orbit constants requiring many mathematical operations to turn the data into position and velocity data for each satellite. In one implementation, this conversion requires 90 multiplies, 58 adds and 21 transcendental function cells (sin, cos, tan) in order to translate the ephemeris into a satellite position and velocity vector at a single point, for one satellite. Most of the computations require double precision, floating point processing.

Thus, the computational load for performing the traditional calculation is significant. The mobile device must include a high-level processor capable of the necessary calculations, and such processors are relatively expensive and consume large amounts of power. Portable devices for consumer use, e.g., a cellular phone or comparable device, are preferably inexpensive and operate at very low power. These design goals are inconsistent with the high computational load required for GPS processing.

Further, the slow data rate from the GPS satellites is a limitation. GPS acquisition at a GPS receiver may take many seconds or several minutes, during which time the receiver circuit and processor of the mobile device must be continuously energized. Preferably, to maintain battery life in portable receivers and transceivers such as mobile cellular handsets, circuits are de-energized as much as possible. The long GPS acquisition time can rapidly deplete the battery of a mobile device. In any situation and particularly in emergency situations, the long GPS acquisition time is inconvenient.

Assisted-GPS ("A-GPS") has gained significant popularity recently in light of stringent time to first fix ("TTFF"), i.e., first position determination, and sensitivity, requirements of the FCC E-911 regulations. In A-GPS, a communications network and associated infrastructure may be utilized to assist the mobile GPS receiver, either as a standalone device or integrated with a mobile station or device. The general concept of A-GPS is to establish a GPS reference network (and/or a wide-area D-GPS network) including receivers with clear views of the sky that may operate continuously. This reference network may also be connected with the cellular infrastructure, may continuously monitor the real-time constellation status, and may provide data for each satellite at a particular epoch time. For example, the reference network may provide the ephemeris and the other broadcast information to the cellular infrastructure. In the case of D-GPS, the reference network may provide corrections that can be applied to the pseudoranges within a particular vicinity. As one skilled in the art would recognize, the GPS reference receiver and its server (or position determination entity) may be located at any surveyed location with an open view of the sky.

However, the signal received from each of the satellites may not necessarily result in an accurate position estimation of the handset or mobile device. The quality of a position estimate largely depends upon two factors: satellite geometry, particularly, the number of satellites in view and their spatial distribution relative to the user, and the quality of the measurements obtained from satellite signals. For example, the larger the number of satellites in view and the greater the distances therebetween, the better the geometry of the satellite constellation. Further, the quality of measurements may be affected by errors in the predicted ephemeris of the satellites, instabilities in the satellite and receiver clocks, ionospheric and tropospheric propagation delays, multipath, receiver noise and RF interference.

A-GPS implementations generally rely upon provided assistance data to indicate which satellites are visible. As a function of the assistance data, a mobile device will attempt to search for and acquire satellite signals for the satellites included in the assistance data. A-GPS positioning may also rely upon the availability of a coarse location estimate to seed the positioning method. This coarse estimate may be utilized to determine a likely set of satellites from which a respective mobile device may receive signals. In the absence of a location estimate or in scenarios having a location estimate with a large uncertainty, the likely set of measurable satellites may be quite large. Further, each of these satellites may not be measurable (e.g., the satellite is no longer visible, etc.). If satellites are included in the assistance data that are not measurable by the mobile device, then the mobile device will waste time and considerable power attempting to acquire measurements for the satellite. Further, signaling methods often limit the number of satellites for which signals may be provided.

Accordingly, there is a need for a method and apparatus for geographic location determination of a device that would overcome the deficiencies of the prior art. Therefore, an embodiment of the present subject matter provides a method for determining the location of a wireless device. The method comprises the steps of determining a first plurality of satellites for a region in which the wireless device is located and determining a second plurality of satellites as a function of an intersection of coverage areas of ones of the first plurality of satellites. Assistance data may be transmitted to the device that includes information from the second plurality of satellites. A location of the device may then be estimated from the information. In another embodiment of the present subject matter, the determination of the first plurality of satellites may be iteratively repeated until the number of satellites is equal to or greater than a predetermined threshold.

Another embodiment of the present subject matter provides a further method for determining the location of a wireless device. The method comprises the steps of determining a first set of satellites for a region in which the wireless device is located and determining a second set of satellites as a function of one or more satellites that are not occluded by the Earth from one or more of the first set of satellites. Assistance data may be transmitted to the device that includes information from the second set of satellites. A location of the device may then be estimated from the information. In another embodiment of the present subject matter, the determination of the first set of satellites may be iteratively repeated until the number of satellites is equal to or greater than a predetermined threshold.

A further embodiment of the present subject matter provides a system for determining a location of a device from signals received from a plurality of GNSS satellites. The system may comprise circuitry for determining a first plurality of satellites for a region in which a device is located and circuitry for determining a second plurality of satellites as a function of an intersection of coverage areas of ones of the first plurality of satellites. The system may further include a transmitter for transmitting assistance data to the device where the assistance data may include information from the second plurality of satellites. The system may also include circuitry for estimating a location of the device from the information.

An additional embodiment of the present subject matter provides a system for determining a location of a device from signals received from a plurality of GNSS satellites. The system may comprise circuitry for determining a first set of satellites for a region in which the device is located and circuitry for determining a second set of satellites as a function of one or more satellites that are not occluded by the Earth from one or more of the first set of satellites. The system may further includes a transmitter for transmitting assistance data to the device where the assistance data may include information from the second set of satellites. The system may also include circuitry for estimating a location of the device from the information.

One embodiment of the present subject matter provides a method for estimating the position of a mobile device using information from a constellation of satellites. The method may comprise receiving first information from a first set of satellites of the constellation and receiving second information from a second set of satellites of the constellation where the second set is selected based on the first information. Data may then be transmitted based on the second information to the device, and a location of the device estimated based on the data.

Yet another embodiment of the present subject matter provides a method for estimating the position of a mobile device using information from a constellation of satellites. The method may comprise selecting a first set of satellites of the constellation and selecting a second set of satellites of the constellation as a function of first signals received from the first set of satellites. Data may be transmitted to the device based on second signals received from the second set of satellites, and a location of the device estimated based on the data.

A further embodiment of the present subject matter provides a method for determining the location of a wireless device. The method may comprise determining a first set of satellites for a region in which the wireless device is located and transmitting assistance data to the device including information from the first set of satellites. The method may further comprise attempting to measure any one or plural signals transmitted from one or more satellites in the first set and determining a second set of satellites as a function of the first signals received from the first set of satellites. Assistance data may then be transmitted to the device that includes information from the second set of satellites. The method may further comprise attempting to measure one or plural signals transmitted from one or more satellites in the second set and estimating a location of the device from the second signals.

In one embodiment of the present subject matter, there is no intersection between the first set and second set of satellites. Of course, in other embodiments any number of satellites may be common between the sets. Exemplary data may be assistance data. In one embodiment of the present subject matter, the second set may be selected as a function of coverage areas of the first signals from ones of the first set of satellites; and in another embodiment, the second set may be selected as a function of one or more satellites that are not occluded by the Earth from the first signals from ones of the first set of satellites. In another embodiment, the method may iteratively repeat the steps represented by blocks 1040 through 1060 until the second set of satellites is equal to or greater than a predetermined threshold. Of course, any one or plural measurements of the second signals during this iterative procedure may be combined to meet the predetermined threshold. Another embodiment may also suppress transmissions of any assistance data during the procedure if the assistance data was previously provided to the device. Yet another embodiment of the present subject matter may include more or less satellites in the second set as a function of satellite elevation.

These embodiments and many other objects and advantages thereof will be readily apparent to one skilled in the art to which the invention pertains from a perusal of the claims, the appended drawings, and the following detailed description of the embodiments.

BRIEF DESCRIPTION OF THE DRAWINGS

FIG. 4 is an algorithm according to one embodiment of the present subject matter.

FIG. 5 is another algorithm according to one embodiment of the present subject matter.

FIG. 6 is an additional algorithm according to one embodiment of the present subject matter.

FIG. 7 is a further algorithm according to one embodiment of the present subject matter.

DETAILED DESCRIPTION

Figure 1:
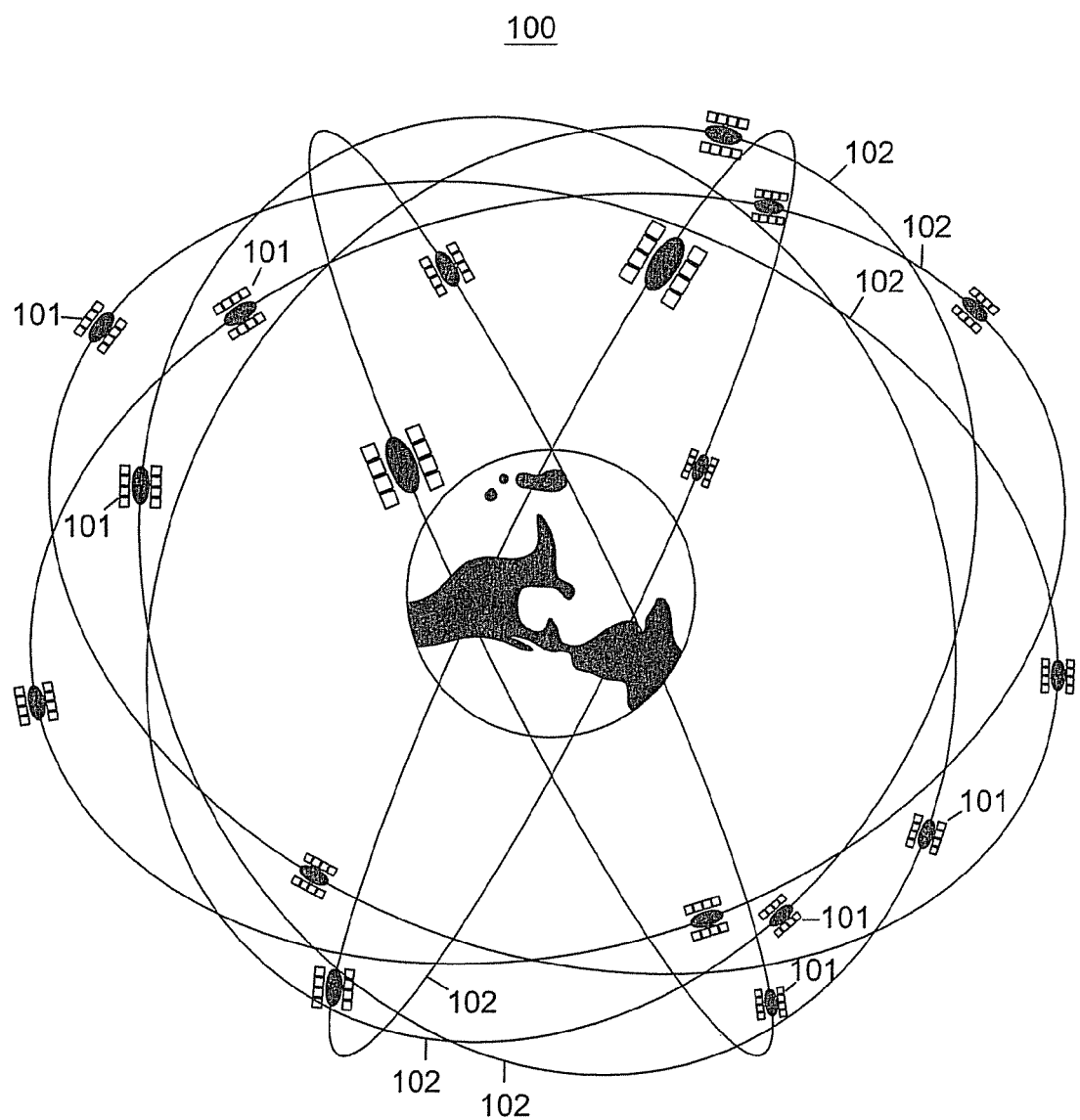
FIG. 1 is a schematic representation of a constellation of GPS satellites.

With reference to the figures where like elements have been given like numerical designations to facilitate an understanding of the present subject matter, the various embodiments of a system and method for A-GPS positioning of a mobile device are herein described.

The disclosure relates to methods and apparatuses for determining geolocation using satellite signals and assistance data. The satellites may be considered as part of a Global Navigation Satellite System ("GNSS"), such as, but not limited to, the U.S. Global Positioning System ("GPS"). While the following description references the GPS system, this in no way should be interpreted as limiting the scope of the claims appended herewith. As is known to those of skill in the art, other GNSS systems operate, for the purposes of this disclosure, similarly to the GPS system, such as, but not limited to, the European Satellite project, Galileo; the Russian satellite navigation system, GLONASS; the Japanese Quasi-Zenith Satellite System ("QZSS"), and the Chinese satellite navigation and positioning system called Beidou (or Compass). Therefore, references in the disclosure to GPS and/or GNSS, where applicable, as known to those of skill in the art, apply to the above-listed GNSS systems as well as other GNSS systems not listed above.

Generally wireless A-GPS devices or handsets have a low time to first fix ("TTFF") as the devices are supplied with assistance data from an exemplary communications network to assist in locking onto or acquiring satellites quickly. Exemplary network elements that supply the assistance data may be a Mobile Location Center ("MLC") or other comparable network element.

Typical A-GPS information includes data for determining a GPS receiver's approximate position, time synchronization mark, satellite ephemerides, and satellite dopplers. Different A-GPS services may omit some of these parameters; however, another component of the supplied information is the identification of the satellites for which a device or GPS receiver should search. The MLC generally determines this information utilizing an approximate location of the device. Conventionally, this approximate location may be the location of the cell tower serving the device. The MLC may then supply the device with the appropriate A-GPS assistance data for the set of satellites in view from this conventional location.

This typical process performs well when the approximate location possesses a small uncertainty; however, in the absence of an approximate location or where the approximate location possesses a large uncertainty (e.g., an uncertainty measured in hundreds of kilometers) the possible set of satellites may be quite large, and not all of the satellites in this set may be measurable. As each satellite requires time and resources to provide assistance data therefor and signaling methods often limit the number of satellites for which signals may be provided, assistance data for only a subset of the set satellites may be provided to the mobile device.

Since A-GPS implementations generally rely upon the provided assistance data to indicate which satellites are visible, the mobile device attempts to acquire only the satellite signals for the satellites included in the assistance data. In the absence of a location estimate, a small number of the satellites included in the assistance data may be measurable for the mobile device resulting in no location fix or a poor quality location fix of the respective device.

Embodiments of the present subject matter may utilize a staged approach to determine a plurality or set of satellites to select and send to a mobile device. In one embodiment of the present subject matter a wide spread of satellites may be selected to ensure an even coverage over a predetermined location, such as, but not limited to, the entire planet or the entirety of the known area of the location estimate, e.g., cell, communications network, city, county, country, continent, etc.

After this selection of satellites, generally one of four outcomes may occur: (i) the device may be able to determine its respective location with adequate precision from available satellite measurements; (ii) the device may be able to provide a rough location estimate with a predetermined number of satellite measurements, but the location estimate may not adequately precise or possesses a poor quality. For example, methods utilizing an earth-centered pseudo-measurement may be employed with three satellite measurements, even with an inadequate precision; standard A-GPS methods may then be employed to determine another set of satellites for which signals may be provided to the device. The remaining outcomes may be that (iii) the device may be able to provide one or two satellite measurements (in this instance, a location estimate may not be determined, however, the satellite measurements may be utilized to select another plurality or set of satellites for which assistance data may be provided or that are more likely to produce additional satellite measurements); and (iv) no satellite measurements are obtained, whereby the aforementioned process may be reattempted with a different set of satellites, or abandoned.

Figure 2:
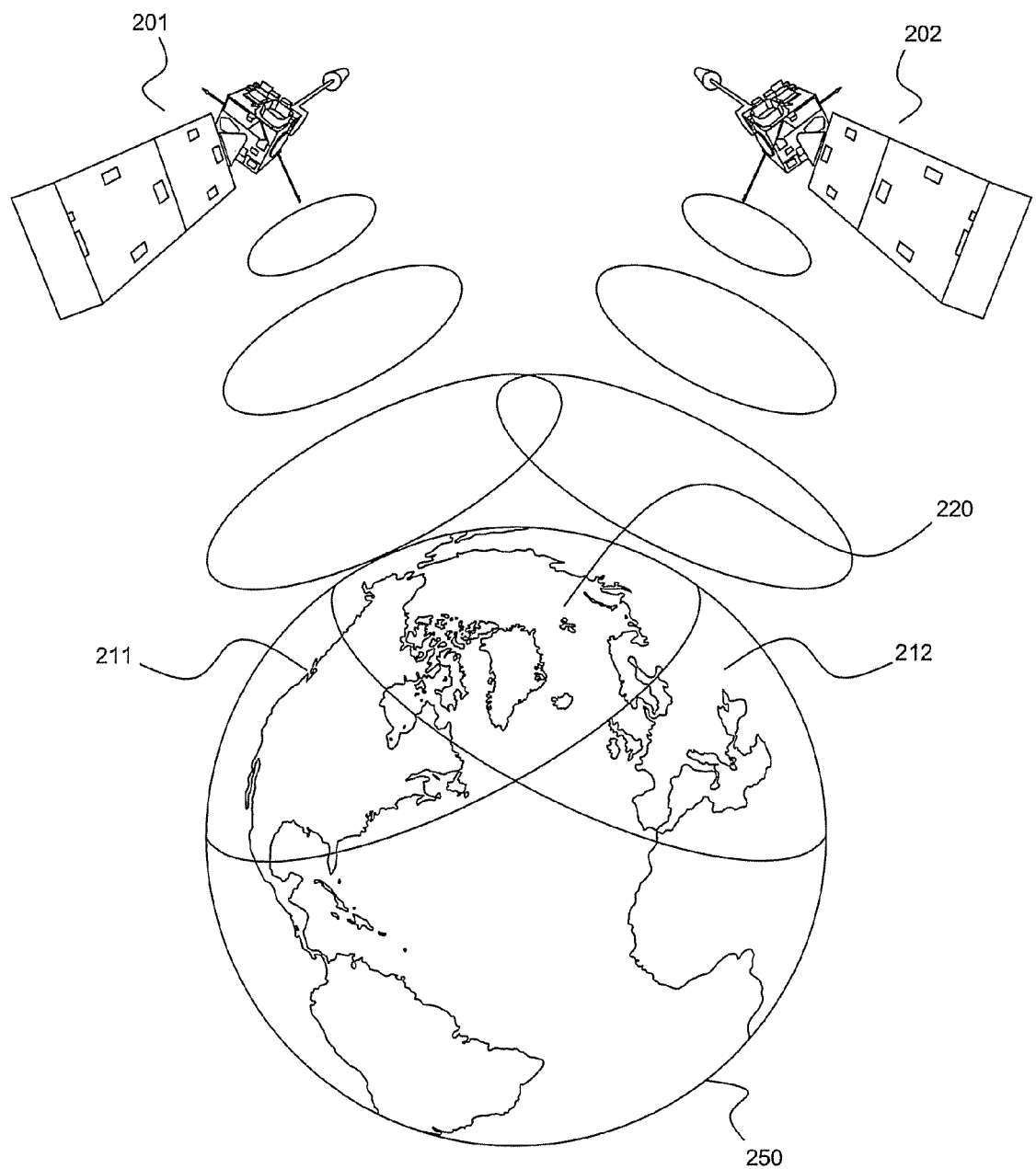
FIG. 2 is a depiction of one method of selecting a second plurality of satellites according to an embodiment of the present subject matter.

In the scenarios where a second plurality or set of satellites may be determined or selected, embodiments of the present subject matter may provide various methods for such a selection. For example, in one embodiment of the present subject matter, a second plurality or set of satellites may be selected as a function of an intersection of the coverage areas of the first plurality of satellites whereby this intersection may be employed as the new reference location. FIG. 2 is a depiction of one method of selecting a second plurality of satellites according to an embodiment of the present subject matter. With reference to FIG. 2, a first satellite 201 and a second satellite 202 may be present in the first plurality or set of satellites. Of course, any number of satellites may be present in the first plurality or set of satellites and the depiction of two satellites in FIG. 2 should not in any way limit the scope of the claims herewith as this depiction is provided for ease of description. The first satellite 201 provides a first coverage area 211 projected upon the surface of the Earth 250. The second satellite 202 provides a second coverage area 212 projected upon the surface of the Earth 250. An intersection area 220 of these two respective coverage areas 211, 212 may be employed as a reference location or estimated location for which a second set or plurality of satellites is determined. In a further embodiment of the present subject matter, the coverage area may be extended or decreased by a predetermined amount or area to thereby increase or reduce the number of satellites in the second plurality or set of satellites.

Figure 3:
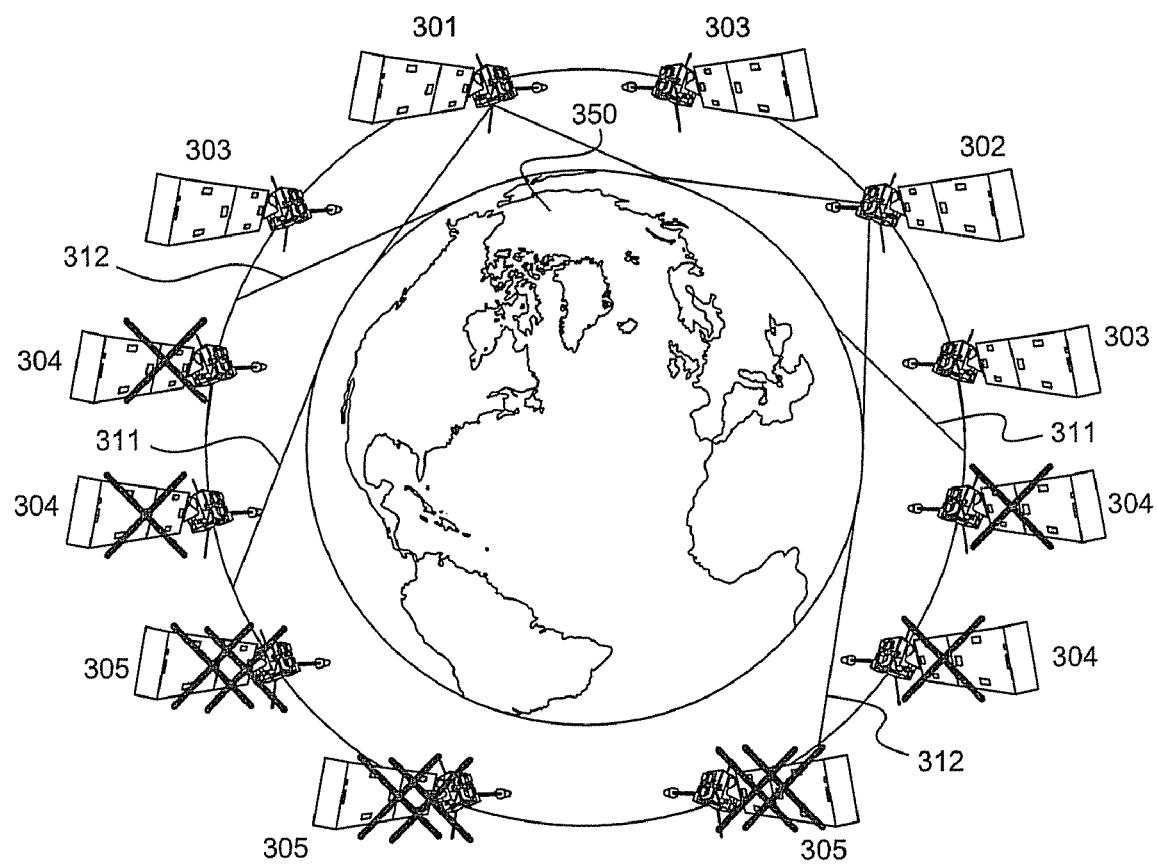
FIG. 3 is a depiction of another method of selecting a second plurality of satellites according to an embodiment of the present subject matter.

In another embodiment of the present subject matter, a second plurality or set of satellites may be selected as a function of an occlusion mask drawn from each measured satellite. FIG. 3 is a depiction of another method of selecting a second plurality of satellites according to an embodiment of the present subject matter. With reference to FIG. 3, signals from a first satellite 301 and a second satellite 302 in a first plurality of satellites may be measured by a device. The first plurality of satellites may be any number or all of the satellites 301, 302, 303, 304, 305 in a satellite constellation. In the scenario depicted by FIG. 3, an occlusion mask 311, 312 may be drawn from any one or more measured satellites 301, 302 (it should be noted that in three-dimensions, the occlusion masks 311, 312 are conical). Satellites 304, 305 may then be removed from a second plurality or set of satellites provided in future assistance data if any one or more of the satellites are occluded by the Earth 350 from any one or more measured satellites 301, 302. As illustrated, three satellites 305 are occluded by the Earth 350 from both measured satellites 301, 302, and four satellites 304 are occluded by the Earth 350 from one of the measured satellites 301 or 302. This illustration is exemplary only and should not in any way limit the scope of the claims appended herewith. Any set or subset of the remaining satellites 301, 302, 303 may then be selected for the second plurality of satellites.

In a further embodiment of the present subject matter, the respective occlusion masks 311, 312 may be extended or decreased by a predetermined amount or angle to thereby alter the conical mask to increase or reduce the number of satellites in the second plurality or set of satellites. For example, an exemplary occlusion mask may be extended if the mobile device is unable to measure satellites below a certain angle above the horizontal. Additionally, an exemplary occlusion mask may be decreased if the mobile device is able to measure satellites at a certain angle below the horizontal.

In one embodiment of the present subject matter the first and second plurality of satellites may be mutually exclusive, that is, there may not be a satellite of the first plurality of satellites that is a member of the second plurality of satellites; therefore, the associated assistance data would also be mutually exclusive. Of course, embodiments of the present subject matter may include one or more common satellites in each of the first and second plurality or sets of satellites, especially in the instance where the mobile device was able to provide a measurement for the common satellite.

FIG. 4 is an algorithm according to one embodiment of the present subject matter. With reference to FIG. 4, a method for determining the location of a wireless device is provided. An exemplary wireless device may be a cellular device, text messaging device, computer, portable computer, vehicle locating device, vehicle security device, communication device, or wireless transceiver. At block 410, a first plurality of satellites may be determined for a region in which the wireless device is located. In one embodiment of the present subject matter, block 410 may be iteratively repeated until the first plurality of satellites is equal to or greater than a predetermined threshold. The satellites may be part of a GNSS, such as, but not limited to, GPS, Galileo, GLONASS, and QZSS. The region in which the wireless device is located may be, but is not limited to, a serving area of a base station serving the wireless device, an approximate area of a communications network, a city, a municipality, a county, a state, a country, a continent, or the Earth.

A second plurality of satellites may then be determined at block 420 as a function of an intersection of coverage areas of ones of the first plurality of satellites. Assistance data may then be transmitted to the device including information from the second plurality of satellites at block 430, and a location of the device estimated from the information at block 440. Of course, the estimated location of the device may also be determined as a function of signals provided by an exemplary cellular network and/or may be determined as a function of a pseudo-measurement. In an alternative embodiment of the present subject matter, no satellite of the first plurality of satellites may be a member of the second plurality of satellites, that is, the sets of satellites are mutually exclusive. Of course, in other embodiments of the present subject matter any number of satellites may also be common between the first and second plurality of satellites. In another embodiment of the present subject matter more or less satellites may be included in the second plurality as a function of satellite elevation.

FIG. 5 is another algorithm according to one embodiment of the present subject matter. With reference to FIG. 5, a method for determining the location of a wireless device is provided. An exemplary wireless device may be a cellular device, text messaging device, computer, portable computer, vehicle locating device, vehicle security device, communication device, or wireless transceiver. At block 510, a first set of satellites may be determined for a region in which the wireless device is located. In one embodiment of the present subject matter, block 510 may be iteratively repeated until the first set of satellites is equal to or greater than a predetermined threshold. The satellites may be part of a GNSS, such as, but not limited to, GPS, Galileo, GLONASS, and QZSS. The region in which the wireless device is located may be, but is not limited to, a serving area of a base station serving the wireless device, an approximate area of a communications network, a city, a municipality, a county, a state, a country, a continent, or the Earth.

A second set of satellites may then be determined at block 520 as a function of one or more satellites that are not occluded by the Earth from one or more of the first set of satellites. In a further embodiment of the present subject matter, block 520 may further comprise including more or less satellites in the second set as a function of satellite elevation. Assistance data may then be transmitted to the device including information from the second set of satellites at block 530, and a location of the device estimated from the information at block 540. Of course, the estimated location of the device may also be determined as a function of signals provided by an exemplary cellular network and/or may be determined as a function of a pseudo-measurement. In an alternative embodiment of the present subject matter, there is no intersection between the first set and second set of satellites. Of course, in other embodiments of the present subject matter any number of satellites may be common between the sets.

FIG. 6 is an additional algorithm according to one embodiment of the present subject matter. With reference to FIG. 6, a method for estimating the position of a mobile device using information from a constellation of satellites is provided. An exemplary mobile device may be a cellular device, text messaging device, computer, portable computer, vehicle locating device, vehicle security device, communication device, or wireless transceiver. The satellites may be part of a GNSS, such as, but not limited to, GPS, Galileo, GLONASS, and QZSS. At block 610, first information from a first set of satellites of the constellation may be received, and at block 620 second information from a second set of satellites of the constellation may be received where the second set of satellites is selected based on the first information. Data may then be transmitted to the device based on the second information at block 630, and a location of the device estimated based on the data at block 640. In one embodiment of the present subject matter, there is no intersection between the first set and second set of satellites. Of course, in other embodiments any number of satellites may be common between the sets. Exemplary data may be assistance data. In another embodiment of the present subject matter, the first information may include coverage areas of ones of the first set of satellites; and in another embodiment, the first information may include whether one or more of the first set of satellites are occluded by the Earth from one or more of the second set of satellites.

FIG. 7 is a further algorithm according to one embodiment of the present subject matter. With reference to FIG. 7, a method for estimating the position of a mobile device using information from a constellation of satellites is provided. An exemplary mobile device may be a cellular device, text messaging device, computer, portable computer, vehicle locating device, vehicle security device, communication device, or wireless transceiver. The satellites may be part of a GNSS, such as, but not limited to, GPS, Galileo, GLONASS, and QZSS. At block 710, a first set of satellites of the constellation may be selected and at block 720, a second set of satellites of the constellation may be selected as a function of first signals received from the first set of satellites. At block 730, data may be transmitted to the device data based on second signals received from the second set of satellites. Then, at block 740, a location of the device may be estimated based on the data. In one embodiment of the present subject matter, there is no intersection between the first set and second set of satellites. Of course, in other embodiments any number of satellites may be common between the sets. Exemplary data may be assistance data. In one embodiment of the present subject matter, the second set may be selected as a function of coverage areas of the first signals from ones of the first set of satellites; and in another embodiment, the second set may be selected as a function of one or more satellites that are not occluded by the Earth from the first signals from ones of the first set of satellites.

Figure 8:
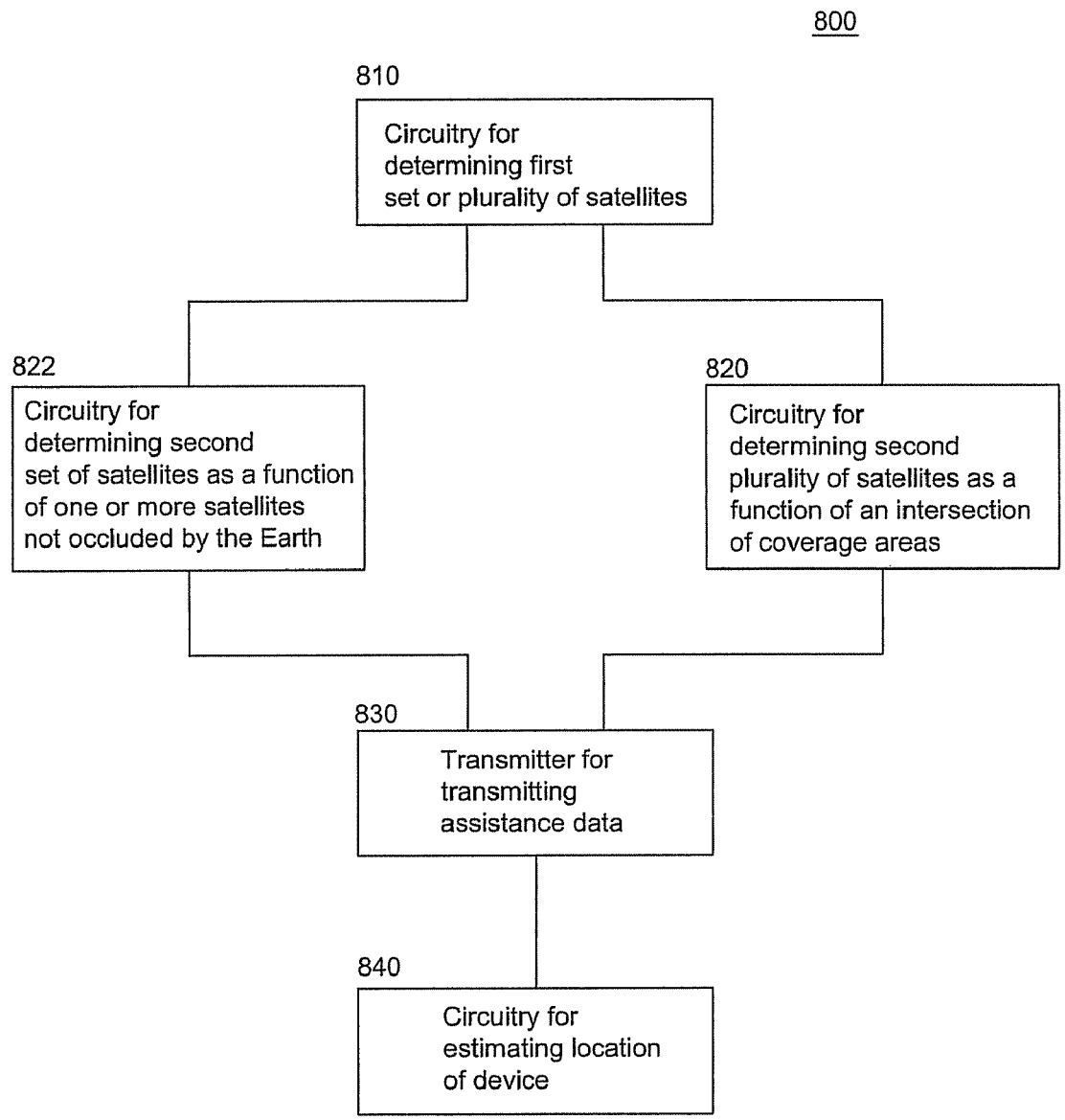
FIG. 8 is a system according to one embodiment of the present subject matter.

FIG. 8 is a system according to one embodiment of the present subject matter. With reference to FIG. 8, a system 800 for determining a location of a device from signals received from a plurality of GNSS satellites may include, as represented at block 810, circuitry for determining a first plurality or set of satellites for a region in which a device is located. The GNSS may be, but is not limited to GPS, Galileo, GLONASS, or QZSS. Exemplary wireless devices may be a cellular device, text messaging device, computer, portable computer, vehicle locating device, vehicle security device, communication device, or wireless transceiver.

In one embodiment the system may include circuitry for determining a second plurality of satellites as a function of an intersection of coverage areas of ones of the first plurality of satellites at block 820. In another embodiment the system may include circuitry for determining a second set of satellites as a function of one or more satellites that are not occluded by the Earth from one or more of the first set of satellites at block 822. The system may also include a transmitter for transmitting assistance data to the device include information from the second plurality or set of satellites, represented by block 830, and the system may include, as represented by block 840, circuitry for estimating a location of the device from the information. In one embodiment of the present subject matter the first and second plurality of satellites may be mutually exclusive or there is no intersection between the first or second sets of satellites. Of course, the estimated location of the device may also be a function of signals provided by a cellular network and/or may be a function of a pseudo-measurement. In an alternative embodiment of the present subject matter, the system may include circuitry for including more or less satellites in the second set or plurality as a function of satellite elevation.

Figure 9:
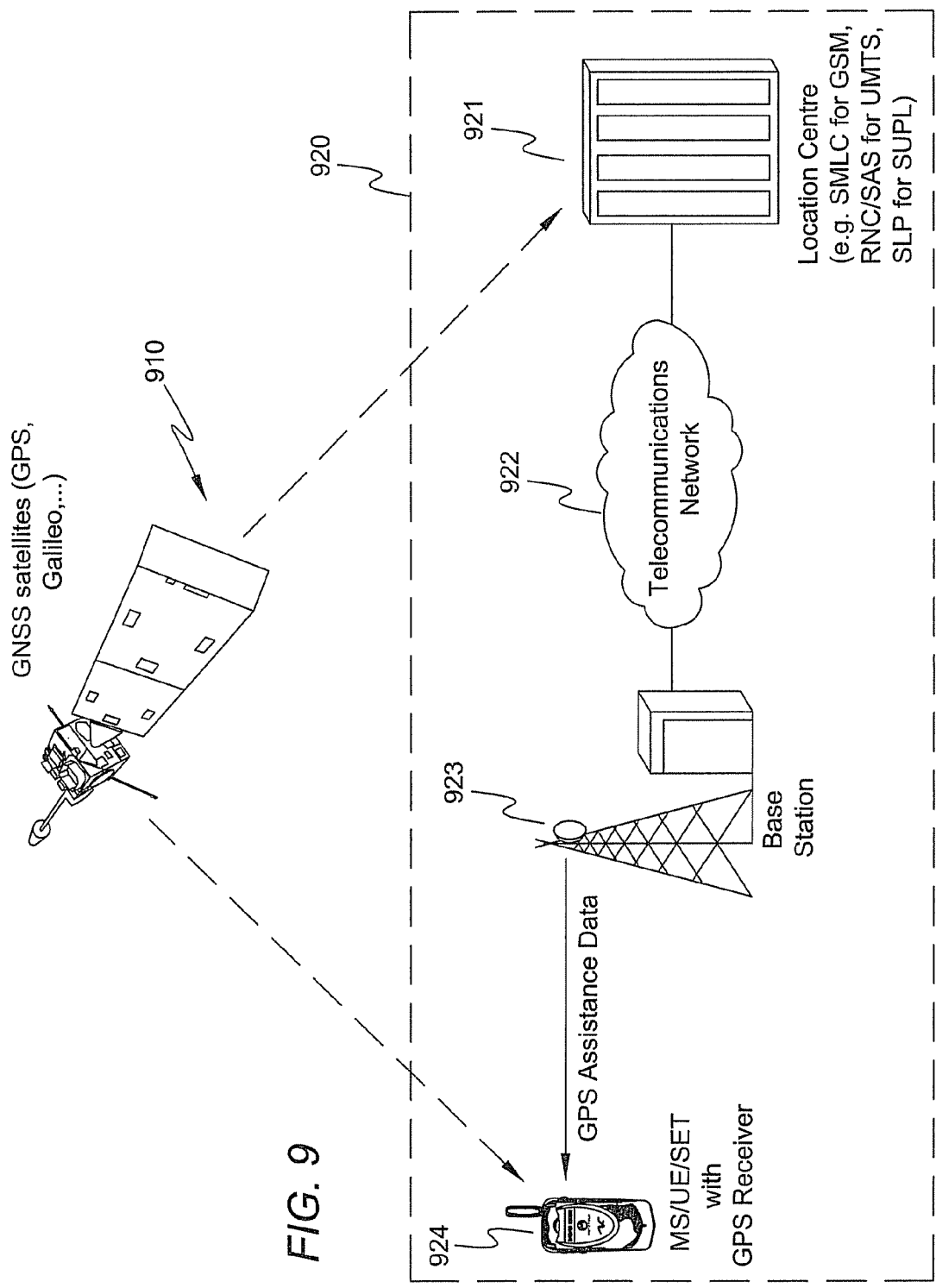
FIG. 9 is a schematic representation for implementing one embodiment of the present subject matter.

FIG. 9 is a schematic representation for implementing one embodiment of the present subject matter. With reference to FIG. 9, a satellite system 910 communicates with a ground system 920. The ground system 920 may include a cellular network having a location center 921. The location center 921 may be a Mobile Location Center (MLC) or a central office configured to communicate with a telecommunication network 922 and at least one base station 923. In one embodiment of the present subject matter, a device 924 communicates with the base station 923 to acquire GPS assistance data. For example, the location center 921 may or may not receive a preliminary estimate of the receiver's location or boundary thereof on the basis of the receiver's cell site or other area, such as the boundary of the communications network or an area or region such as, but not limited to, city, municipality, county, state, country, or continent. The location center 921 may also determine a plurality of satellites as a function of this boundary or region and determine whether any one or more of these plural satellites, while operational, are not visible by the device 924 for some reason. The location center 921 may also receive satellite information from GPS satellites. The satellite information may include the satellite's broadcast ephemeris information of the broadcasting satellite or that of all satellites or that of selected satellites. Further, the location center 921 may manipulate the assistance data to prevent the device 924 from searching and attempting to acquire signals from these one or more plural satellites. This information may then be transmitted or relayed to the mobile receiver and utilized for location determination. The location center 921 may relay the information back to the device 924 or use the information, either singularly or along with some preliminary estimation of the device's location, to assist the device in a geographic location determination. In another embodiment, any one or plural steps illustrated in FIGS. 2-7 may be implemented at the location center 921 and communicated to the device 924. Of course, the estimated location of the device 924 may be determined as a function of additional signals provided by the network 922. Exemplary devices may be, but are not limited to, a cellular device, text messaging device, computer, portable computer, vehicle locating device, vehicle security device, communication device, and wireless transceiver.

Figure 10:
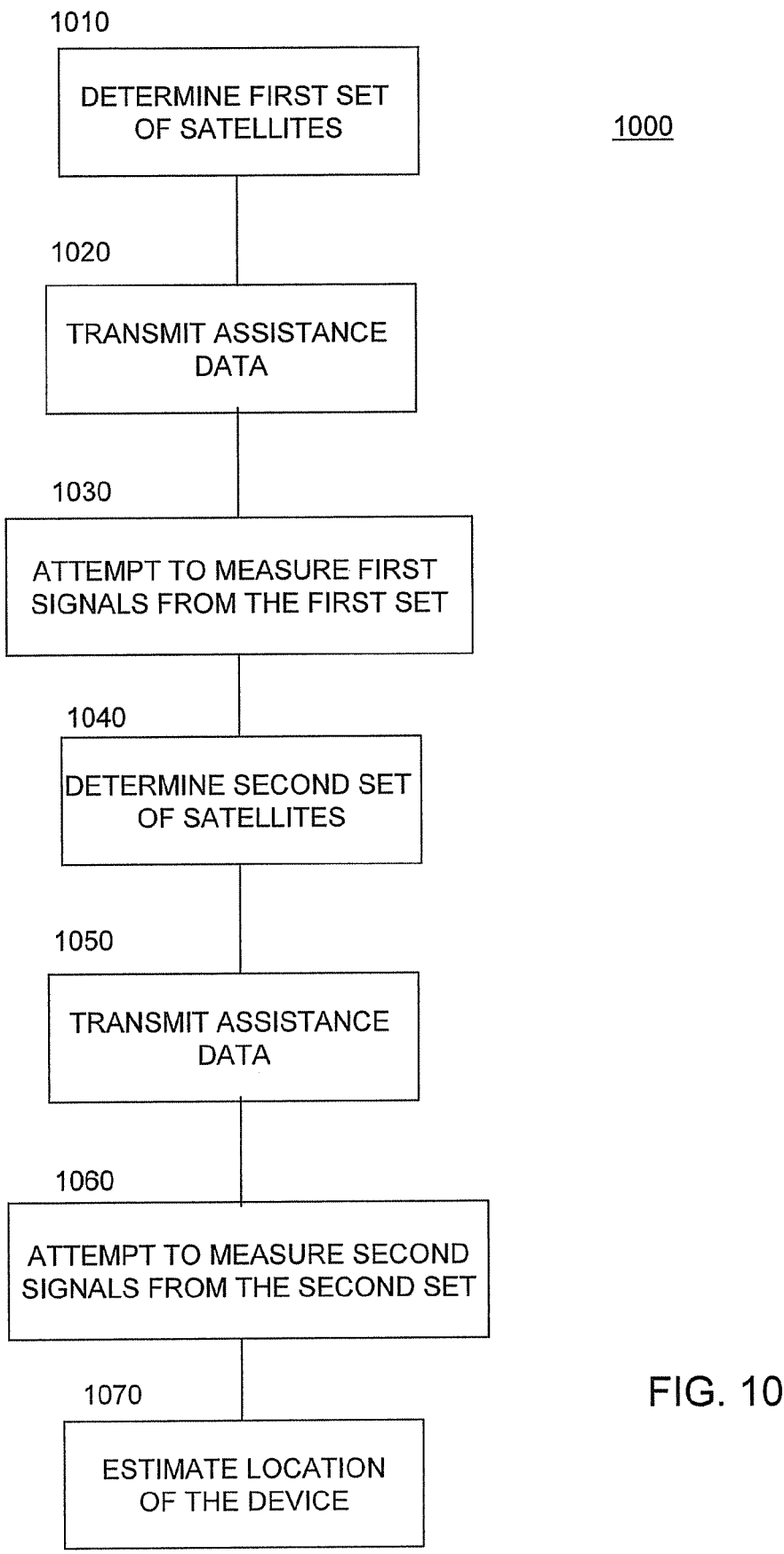
FIG. 10 is another algorithm according to one embodiment of the present subject matter.

FIG. 10 is another algorithm according to one embodiment of the present subject matter. With reference to FIG. 10, a method for determining the location of a wireless device 1000 is provided. An exemplary mobile device may be a cellular device, text messaging device, computer, portable computer, vehicle locating device, vehicle security device, communication device, or wireless transceiver. The method may comprise determining a first set of satellites for a region in which the wireless device is located at step 1010. The satellites may be part of a GNSS, such as, but not limited to, GPS, Galileo, GLONASS, and QZSS. Exemplary regions may be, but are not limited to, a serving area of a base station serving the wireless device, an approximate area of a communications network, a city, a municipality, a county, a state, a country, a continent, and the Earth. At step 1020, assistance data may be transmitted to the device that includes information from the first set of satellites. An attempt at measuring any signal transmitted from one or more satellites in the first set may be employed at step 1030. A second set of satellites may then be determined as a function of the first signals received from the first set of satellites at step 1040. At step 1050, assistance data may be transmitted to the device that includes information from the second set of satellites. An attempt at measuring any signal transmitted from one or more satellites in the second set may be conducted at step 1060. In one embodiment of the present subject matter, the device may not attempt to measure one or more satellites in the first set already possessing a measured first signal. At step 1070, a location of the device may be estimated from the second signals. In another embodiment the location may also be estimated as a function of a pseudo-measurement.

In one embodiment of the present subject matter, there is no intersection between the first set and second set of satellites. Of course, in other embodiments any number of satellites may be common between the sets. Exemplary data may be assistance data. In one embodiment of the present subject matter, the second set may be selected as a function of coverage areas of the first signals from ones of the first set of satellites; and in another embodiment, the second set may be selected as a function of one or more satellites that are not occluded by the Earth from the first signals from ones of the first set of satellites. In another embodiment, the method may iteratively repeat the steps represented by blocks 1040 through 1060 until the second set of satellites is equal to or greater than a predetermined threshold. Of course, any one or plural measurements of the second signals during this iterative procedure may be combined to meet the predetermined threshold. Another embodiment may also suppress transmissions of any assistance data during the procedure if the assistance data was previously provided to the device. Yet another embodiment of the present subject matter may include more or less satellites in the second set as a function of satellite elevation.

It is therefore an aspect of embodiments of the present subject matter to improve the probability of successfully utilizing A-GPS to determine a position of a mobile device in the absence of a location estimate or in the absence of a quality location estimate.

It is also an aspect of the embodiments of the present subject matter to limit the amount of time that a mobile device spends in acquiring satellite signals thereby providing a greater probability of success than many other A-GPS methods.

As shown by the various configurations and embodiments illustrated in FIGS. 1-10, a method and system for A-GPS positioning of a mobile device have been described.

While preferred embodiments of the present subject matter have been described, it is to be understood that the embodiments described are illustrative only and that the scope of the invention is to be defined solely by the appended claims when accorded a full range of equivalence, many variations and modifications naturally occurring to those of skill in the art from a perusal hereof.

We claim:

1. A method for determining the location of a wireless device comprising the steps of:
    (a) determining a first set of satellites for a region in which the wireless device is located;
    (b) transmitting first assistance data to said device, said first assistance data including first information from said first set of satellites;
    (c) attempting to measure first signals transmitted from one or more satellites in said first set;
    (d) determining a second set of satellites as a function of said first signals received from said first set of satellites;

(e) transmitting second assistance data to said device, said second assistance data including second information from said second set of satellites;

(f) attempting to measure second signals transmitted from one or more satellites in said second set; and (g) estimating a location of the device from said second signals.

2. The method of claim 1 further comprising iteratively repeating steps (d) through (f) until said second set of satellites is equal to or greater than a predetermined threshold.

3. The method of claim 2 further comprising the step of combining measurements of said second signals from one or more iterations to meet said predetermined threshold.

4. The method of claim 1 wherein there is no intersection between the first set and second set of satellites.

5. The method of claim 1 wherein attempting to measure second signals further comprises ensuring that said device does not attempt to measure one or more satellites in said first set having a measured first signal.

6. The method of claim 1 further comprising the step of suppressing transmissions of ones of said second assistance data if said second assistance data was previously provided to said device.

7. The method of claim 1 wherein said second set is selected as a function of coverage areas of said first signals from ones of said first set of satellites.

8. The method of claim 1 wherein said second set is selected as a function of one or more satellites that are not occluded by the Earth from said first signals from ones of said first set of satellites.

9. The method of claim 1 wherein the estimated location of the device is a function of signals provided by a cellular network.

10. The method of claim 1 wherein the satellites are part of a Global Navigation Satellite System ("GNSS").

11. The method of claim 10 wherein the GNSS is selected from the group consisting of: Global Positioning System ("GPS"), Galileo, GLONASS, and Quasi-Zenith Satellite System ("QZSS").

12. The method of claim 1 wherein the wireless device is selected from the group consisting of: cellular device, text messaging device, computer, portable computer, vehicle locating device, vehicle security device, communication device, and wireless transceiver.

13. The method of claim 1 wherein said region is selected from the group consisting of: a serving area of a base station serving said wireless device, an approximate area of a communications network, a city, a municipality, a county, a state, a country, a continent, and the Earth.

14. The method of claim 1 wherein said location is estimated as a function of a pseudo-measurement.

15. The method of claim 1 wherein determining a second set of satellites further comprises including more or less satellites in said second set as a function of satellite elevation.

\* \* \* \* \*